United States Patent
Enomoto et al.

[11] Patent Number: 6,025,449
[45] Date of Patent: Feb. 15, 2000

[54] WATER-SOLUBLE ACRYLIC RESIN, RESIN COMPOSITION CONTAINING THE SAME FOR USE IN WATER-BASED COATING COMPOSITION, WATER-BASED COATING COMPOSITION AND COATING METHOD BY USE OF THE SAME

[75] Inventors: Masashi Enomoto; Nobushige Numa, both of Kanagawa-ken; Tomokuni Ihara, Hiratsuka; Hirofumi Fukuyama, Hiratsuka; Hajime Sukejima, Hiratsuka; Hiroto Takeuchi, Hiratsuka, all of Japan

[73] Assignee: Kansai Paint Co., Ltd., Hyogo-ken, Japan

[21] Appl. No.: 09/031,659

[22] Filed: Feb. 27, 1998

[30] Foreign Application Priority Data

| Mar. 5, 1997 | [JP] | Japan | 9-049514 |
| Mar. 5, 1997 | [JP] | Japan | 9-049515 |
| Feb. 10, 1998 | [JP] | Japan | 10-043014 |

[51] Int. Cl.[7] .................................................. C08F 18/00
[52] U.S. Cl. ................................. 526/320; 524/558
[58] Field of Search ........................ 524/558; 526/320

[56] References Cited

U.S. PATENT DOCUMENTS

| 4,045,399 | 8/1977 | Suzuki | 524/558 |
| 4,435,556 | 3/1984 | Masler | 524/558 |
| 4,836,966 | 6/1989 | Shimuzu | 524/558 |
| 4,859,756 | 8/1989 | Goertz | 526/263 |
| 4,916,176 | 4/1990 | Vachlas et al. |  |
| 5,151,125 | 9/1992 | Kuwajima et al. |  |
| 5,166,242 | 11/1992 | Chu | 524/558 |
| 5,288,807 | 2/1994 | Hinz | 525/279 |
| 5,514,755 | 5/1996 | Fenn | 525/329.5 |
| 5,658,981 | 8/1997 | Ohsumi | 524/555 |
| 5,663,266 | 9/1997 | Taylor | 526/325 |
| 5,741,880 | 4/1998 | Valpey | 528/74 |
| 5,817,426 | 10/1998 | Spada | 428/483 |

FOREIGN PATENT DOCUMENTS

| 0 238 222 | 2/1987 | European Pat. Off. . |
| 0 319 971 | 12/1988 | European Pat. Off. . |
| 0 458 245 | 5/1991 | European Pat. Off. . |
| 3832826 | 4/1990 | Germany . |
| 3838179 | 6/1990 | Germany . |
| 4027594 | 3/1992 | Germany . |
| 62-193676 | 8/1987 | Japan . |
| 89-289741 | 2/1989 | United Kingdom . |
| 96-397313 | 9/1996 | United Kingdom . |

OTHER PUBLICATIONS

P. 97 of vol. 107, 42–Coatings (1987).

"Chemical Abstracts", vol. 113 (1990), p. 382.

*Primary Examiner*—Paul R. Michl
*Attorney, Agent, or Firm*—Fisher, Christen & Sabol

[57] ABSTRACT

A water-soluble acrylic resin which is prepared by neutralizing with a neutralizing agent an acrylic copolymer formed by copolymerizing (a) an alkylene oxide group-containing (meth)acrylate, (b) a cyclic saturated hydrocarbon group-containing (meth)acrylate, (c) a hydroxyl group-containing unsaturated monomer other than the monomer (a), and (d) other unsaturated monomer; a resin composition used for a water-based coating composition and containing, as a vehicle component, the above water-soluble acrylic resin; a water-based coating composition containing, as major components, (A) at Least one resin selected from the group consisting of a water-soluble resin and a water-dispersible resin and (B) a pigment, said pigment (B) being subjected to dispersion treatment; with a water-soluble acrylic resin (C), which is prepared by neutralizing with a neutralizing agent an acrylic copolymer formed by copolymerizing (a) an alkylene oxide group-containing (meth)acrylate, (b) a cyclic saturated hydrocarbon group-containing (meth)acrylate, and (e) other unsaturated monomer, followed by being mixed with the resin (A) to form a water-based coating composition; a coating method comprising coating a base coat coating composition onto a substrate followed by coating a top clear coating composition, the above water-based coating composition being used as the base coat coating composition.

12 Claims, No Drawings

WATER-SOLUBLE ACRYLIC RESIN, RESIN COMPOSITION CONTAINING THE SAME FOR USE IN WATER-BASED COATING COMPOSITION, WATER-BASED COATING COMPOSITION AND COATING METHOD BY USE OF THE SAME

BACKGROUND OF THE INVENTION (1) Field of the Invention

The present invention relates to a water-soluble acrylic resin capable of forming a coating film showing good water resistance without developing whitening and a resin composition containing the water-soluble acrylic resin for use in a water-based coating composition, and further relates to a water-based coating composition showing good pigment dispersibility and storage stability, and capable of forming a coating film showing good water resistance and adhesion properties and to a coating method using the water-based coating composition as a base coat coating composition.

(2) Description of the Background Art

Although an organic solvent-based coating composition has widely been used for coating an automobile body or the like in the art, recently the use of the organic solvent-based coating composition is being replaced with the use of a water-based coating composition from the standpoints of atmospheric pollution and resources saving. Particularly, in the case of a finish coating method which comprises coating a base coat coating composition followed by coating a clear coating composition, various methods of making the base coat coating composition a water-based one have been proposed (see, for example, Japanese Patent Application Laid-Open No. 193676/87). The water-based coating composition for use in the base coat usually uses resin components such as an acrylic resin emulsion, urethane resin emulsion, water-soluble acrylic resin and the like.

However, in the case where the water-based coating composition containing the above resin component is used as of a cold-drying type, a coating film is formed by fusion-bonding between emulsion particles, resulting in that the resulting coating film shows remaining shapes of emulsion particles. A water resistance test of the above coating film shows that water is localized on an interfacial boundary between emulsion particles to remarkably develop whitening. For the purpose of solving the above problems, studies have been made on a combined use of a water-soluble acrylic resin with the above resin emulsion so as to bridge a gap between emulsion particles with the water-soluble acrylic resin and to improve water resistance with the result that the use of the above water-soluble acrylic resin showed unsatisfactory water resistance.

For the purpose of improving water resistance of the coating film formed by use of the water-soluble acrylic resin, studies have been made on imparting hydrophobic properties to the water-soluble acrylic resin without impairing water solubility, and on use as a comonomer of a hydrophobic monomer such as a monomer having a long chain alkyl group, styrene and the like, resulting in such problems that the use of the monomer having long chain alkyl group causes reduction in a glass transition temperature Tg of the resin, poor high temperature water resistance and a brittle coating film, and that the use of styrene causes remarkable development of whitening during drying of the coating film and development of whitening after drying too, along with such problems that too increase in hydrophobic properties may develop seeding on mixing with a pigment.

On the other hand, a so-called metallic coating by use of a coating composition containing a metal pigment such as aluminum flake or the like, and a so-called solid coating by use of a coating composition containing an organic or inorganic color pigment have been applied to a finish coating of an automobile body and the like. Attempts on the preparation of a water-based coating composition from the above coating compositions produced the following problems.

In the case of the coating composition containing the metal pigment, addition of water causes generation of hydrogen gas and produced problems of safety and storage stability, resulting in making a long period of storage of the above coating composition impossible. For the purpose of solving the above problems, various methods, for example, a method of dispersion-treating a metal pigment such as aluminum flake by use of a phosphate group-containing treating agent, have been disclosed, for example, in U.S. Pat. No. 4,916,176, EP238222, EP319971, U.S. Pat. No. 5,151,125, EP458245, etc. According to the above methods, the metal pigment is coated with a treating agent containing phosphate group, sulfate group or the like to form a water-dispersible pigment paste capable of being added to a water-based coating composition, resulting in making it possible to control the generation of hydrogen gas. Application of the above treating agents to a metal pigment having a small particle size resulted in making it impossible to satisfactorily control the generation of hydrogen gas and in producing problems of water resistance and adhesion properties of the resulting coating film.

In the case of the coating composition containing the color pigment, on preparing a water-based coating composition, use of a dispersion paste prepared by using the conventionally used aqueous acrylic resin as a resin for dispersion produced such problems that an unsatisfactory adsorption of the resin to the color pigment may cause to increase a viscosity of the dispersion paste during storage, resulting in making it difficult to increase a pigment concentration to a high level. Recently, preparation of a dispersion paste having good color conditioning workability and capable of forming a coating film having high clarity and higher transparency has been demanded for use in a base coat coating composition in a finish coating method.

SUMMARY OF THE INVENTION

It is an object of the present invention to provide a water-soluble acrylic resin which has been made hydrophobic to a suitable extent without impairing water solubility.

It is another object of the present invention to provide a resin composition containing the water-soluble acrylic resin and used for a water based coating composition which is capable of forming a coating film showing good water resistance without developing whitening.

It is another object of the present invention to provide a water-based coating composition which contains a metal pigment particularly having a small particle size, which is capable of controlling generation of hydrogen gas, and which is capable of forming a coating film showing good water resistance and adhesion properties.

It is another object of the present invention to provide a water-based coating composition, which contains a color pigment, which is capable of improving dispersibility and storage stability, and which is capable of forming a coating film showing good water resistance and adhesion properties.

It is another object of the present invention to provide a coating method by use to the water-based coating composition.

That is, in a first aspect of the present invention, the present invention provides a water-soluble acrylic resin which is prepared by neutralizing with a neutralizing agent an acrylic copolymer formed by copolymerizing 1 to 30% by weight of (a) an alkylene oxide group-containing (meth) acrylate represented by the following general formula (I):

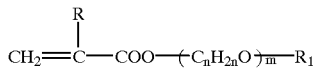
(I)

where R is hydrogen atom or methyl group, $R_1$ is hydrogen atom, alkyl group or acyl group, m is an integer of 1 to 200, and n is an integer of 2 or 3; 0.5 to 80% by weight of (b) a cyclic saturated hydrocarbon group-containing (meth) acrylate, 0 to 30% by weight of (c) a hydroxyl group-containing unsaturated monomer other than the monomer (a), and 0 to 98.5% by weight of (d) other unsaturated monomer.

In a second aspect of the present invention, the present invention provides a resin composition used for a water-based coating composition and containing, as a vehicle component, a water-soluble acrylic resin which is prepared by neutralizing with a neutralizing agent an acrylic coplymer formed by copolymerizing 1 to :30% by weight of (a) an alkylene oxide group-containing (me,h)acrylate represented by the general formula (I):

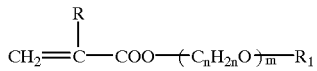
(I)

where R is hydrogen atom or methyl group, $R_1$ is hydrogen atom, alkyl group or acyl group, m is an integer of 1 to 200, and n is an integer of 2 or 3; 0.5 to 80% by weight of (b) a cyclic saturated hydrocarbon group-containing (meth) acrylate, 0 to 30% by weight of (c) a hydroxyl group-containing unsaturated monomer other than the monomer (a), and 0 to 98.5% by weight of (d) other unsaturated monomer.

In a third aspect of the present invention, the present invention provides a water-based coating composition containing, as major components, (A) at least one resin selected from the group consisting of a water-soluble resin and a water-dispersible resin and (B) a pigment, said pigment (B) being subjected to dispersion treatment with a water-soluble acrylic resin (C), which is prepared by neutralizing with a neutralizing agent an acrylic copolymer formed by copolymerizing (a) an alkylene oxide group-containing (meth) acrylate represented by the following general formula (I):

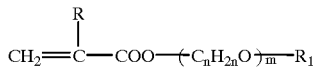
(I)

where R is hydrogen atom or methyl group, $R_1$ is hydrogen atom, alkyl group or acyl group, m is an integer of 1 to 100, and n is an integer of 2 or 3, (b) a cyclic saturated hydrocarbon group-containing (meth)acrylate, and (e) other unsaturated monomer, followed by being mixed with the resin (A) to form a water-based coating composition.

In a fourth aspect of the present invention, the present invention provides a coating method comprising coating a base coat coating composition onto a substrate followed by coating a top clear coating composition, a water-based coating composition containing, as major components, (A) at least one resin selected from -the group consisting of a water-soluble resin and a water-dispersible resin and (B) a pigment, said pigment (B) being subjected to dispersion treatment with a water-soluble acrylic resin (C), which is prepared by neutralizing with a neutralizing agent an acrylic copolymer formed by copolymerizing (a) an alkylene oxide group-containing (meth)acrylate represented by the following general formula (I):

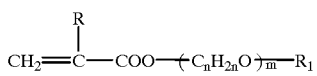
(I)

where R is hydrogen atom or methyl group, $R_1$ is hydrogen atom, alkyl group or acyl group, m is an integer of 1 to 100, and n is an integer of 2 or 3, (b) a cyclic saturated hydrocarbon group-containing (met;h)acrylate, and (e) other unsaturated monomer, followed by being mixed with the resin (A) to form the water-based coating composition, being used as the base coat coating composition.

DETAILED DESCRIPTION OF THE INVENTION

The water-soluble acrylic resin in the first aspect of the present invention is prepared by neutralizing with a neutralizing agent an acrylic copolymer formed by copolymerizing (a) the alkylene oxide group-containing (meth) acrylate represented by the above general formula (I), (b) the cyclic saturated hydrocarbon group-containing (meth)acrylate, (c) the hydroxyl group-containing unsaturated monomer other than the monomer (a) and (d) other unsaturated monomer.

The alkylene oxide group-containing (meth)acrylate represented by the general formula (I) is such that $R_1$ in the general formula preferably has 1 to 8 carbon atoms when alkyl group or acyl group, and m is preferably in the range of 1 to 200, preferably 10 to 100. When m in the general formula is more than 200, copolymerization properties and compatibility with other monomers are undesirably reduced.

Examples of the monomer (a) may include diethylene glycol (meth)acrylate, triethylene glycol (meth)acrylate, polyethylene glycol (meth)acrylate, dipropylene glycol (meth) acrylate, tripropylene glycol (meth)acrylate, polypropylene glycol (meth)acrylate, polyethylene polypropylene glycol (meth)acrylate, methoxyethylene glycol (meth) acrylate, ethoxyethylene glycol (meth)acrylate, ethoxydiethylene glycol (meth)acrylate, ethoxytriethylene glycol (meth) acrylate, ethoxypolyethylene glycol (meth)acrylate, propoxytriethylene glycol (meth)acrylate, methoxypropylene glycol (meth) acrylate, ethoxypropylene glycol (meth) acrylate, ethoxydipropylene glycol (meth)acrylate, ethoxytripropylene glycol (meth)acrylate, ethoxypolypropylene glycol (meth) acrylate, propoxytripropylene glycol (meth) acrylate, and the like. These may be used singly or in combination.

The cyclic saturated hydrocarbon group-containing (meth) acrylate (b) may include ones containing monocyclic hydrocarbon group, bridged alicyclic hydrocarbon group and bicyclic terpene group respectively, for example, isobornyl (meth)acrylate, adamantyl (meth)acrylate, bicyclo [3,3,1] nonyl (meth)acrylate, cyclohexyl (meth)acrylate, t-butylcyclohexyl (meth)acrylate and the like. These may be used singly or in combination. Particularly, isobornyl (meth) acrylate and adamantyl (meth)acrylate are preferred.

Examples of the hydroxyl group-containing unsaturated monomer (c) other than the monomer (a) may include hydroxyalky esters of (meth)acrylic acid having 2 to 8 carbon atoms, for example, 2-hydroxyethyl (meth)acrylate, hydroxypropyl (meth)acrylate and the like; N-methylol acrylamide, allyl alcohol, ε-caprolactone-modified acrylic monomer, and the like. These may be used singly or in combination.

Examples of other unsaturated monomer (d) may include alkyl esters of (met;h)acrylic acid having 1 to 24 carbon atoms, for example, methyl (meth)acrylate, ethyl (meth) acrylate, n-propyl (meth)acrylate, i-propyl (meth)acrylate, n-butyl (meth)acrylate, i-butyl (meth)acrylate, t-butyl (meth) acrylate, 2-ethylhexyl (meth)acrylate, octyl (meth) acrylate, lauryl (meth)acrylate and the like; vinyl aromatic compounds such as styrene, vinyl toluene and the like; N-vinyl pyrrolidone, ethylene, butadiene, chloroprene, vinyl propionate, vinyl acetate, (meth)acrylonitrile, glycidyl (meth)acrylate, and the like. These may be used singly or in combination depending on desirable properties.

For the purpose of imparting water-solubility to the acrylic copolymer, an acid group-containing monomer may suitably be used as a comonomer. Examples of the acid group-containing monomer may include (meth)acrylic acid, maleic acid, crotonic acid, itaconic acid, β-carboxyethyl acrylate, 2-acrylamido-2-methylpropane sulfonic acid, allyl sulfonic acid, sodium styrene sulfonate, sulfoethyl methacrylate, sodium salt thereof and ammonium salt thereof, phosphate group-containing monomer such as "Light Ester PM" (trade name, marketed by Light Ester Co., Ltd.), and the like. These may be used singly or in combination. Of these, carboxyl group-containing ones may preferably be used at least partly. The acid group-containing monomer may be contained in the monomer mixture in an amount of 10% by weight or less, preferably 0.5 to 5%, by weight.

The above acrylic copolymer may be prepared by copolymerizing the above monomers by use of a radical polymerization initiator according to the known polymerization process such as the solution polymerization. Examples of the solvent to be used may include cellosolves, alcohols, carbitols, cellosolve acetates and the like. Examples of the radical polymerization initiator may include peroxides, azo compounds and the like.

A mixing ratio of the above monomers is such that the monomer (a) is in the range of 1 to 30% by weight, preferably 5 to 20% by weight, the monomer (b) is in the range of 0.5 to 80% by weight, preferably 5 to 50% by weight, the monomer (c) is in the range of 0 to 30% by weight, preferably 5 to 15% by weight, and the monomer (d) is in the range of 0 to 98.5% by weight, preferably 15 to 85% by weight. When an amount of the monomer (a) is less than 1% by weight, an effect on hydrophilic properties becomes unsatisfactory. On the other hand, when more than 30% by weight, a resulting coating film may easily be dissolved in water. When an amount of the monomer (b) is less than 0.5% by weight, hydrophobic properties is at an unsatisfactory level. On the other hand, when more than 80% by weight, film-forming properties may become poor, and cracks may easily develop on the resulting coating film. When an amount of the monomer (c) is more than 30% by weight, too strong hydrophilic properties may cause to reduce water resistance of the coating film. An amount more than 98.5% by weight of the monomer (d) may make water dispersibility poor.

The acrylic copolymer obtained as above preferably has a weight average molecular weight of 10,000 to 200,000, preferably 30,000 to 100,000. The weight average molecular weight less than 10,000 reduces water resistance of the coating film, On the other hand, when more than 200,000, viscosity is remarkably increased.

The acrylic copolymer has a glass transition temperature in the range of −10 to 80° C., preferably 0 to 50° C. The glass transition temperature less than −10° C. reduces hot water resistance of the coating film. On the other hand, when higher than 80° C., film-forming properties may be reduced and cracks may easily develop on the coating film.

The acrylic copolymer has a solubility parameter measured by the turbidity point titration in the range of 8.5 to 11.0, preferably 8.8 to 10.5. The solubility parameter (SP) of the acrylic copolymer is measured by the turbidity point titration as a practical measuring method, and means a value calculated in accordance with the following K. W. SUH, J. M. CORBETT'S equation (Journal of Applied Polymer Science, 12, 2359, 1968):

$$SP = \frac{\sqrt{V_H} \cdot \delta_H + \sqrt{V_D} \cdot \delta_D}{\sqrt{V_H} + \sqrt{V_D}}$$

where $V_H$ is a volume fraction of n-hexane, $V_D$ is a volume fraction of deionized water, $\delta_H$ is a solubility parameter of n-hexane, $\delta_D$ is a solubility parameter of deionized water.

The above turbidity point titration is such that 0.5 g of a dried resin composition as a solid content is dissolved in 10 ml of acetone, followed by adding n-hexane thereinto to read a titrated amount H (ml) of n-hexane at a turbidity point. Similarly, deionized water is added into an acetone solution of the resin composition to read a titrated amount D (ml) of the deionized water. From the above titrated amounts H(ml) and D(ml), $V_H$, $V_D$, $\delta_H$ and $\delta_D$ in the above equation are determined according to the following equations:

$V_H$=H/(10+H)

$V_D$=D/(10+D)

$\delta_H$=9.75×10/(10+H)+7.24×H/(10+H)

$\delta_D$=9.75×10/(10+D)+23.43×D/(10+D)

where $V_H$ is a volume fraction of n-hexane, and $V_D$ is a volume fraction of deionized water. Respective solubility parameters of respective solvents are as follows: acetone: 9.75, n-hexane: 7.24, deionized water: 23.43.

When the solubility parameter of the acrylic copolymer is less than 8.5, whitening may develop on the coating film. On the other hand, when more than 11.0, water absorption properties of the coating film may be increased, resulting in reducing water resistance.

Examples of the neutralizing agent used for neutralizing the acrylic copolymer may include basic compounds such as ammonia, amine, hydroxides and carbonates of alkali metals, and the like. Of these the amine is preferable. Examples of the amine may include primary, secondary or tertiary alkylanine, primary, secondary or tertiary alkanolamine, cycloalkylamine and the like. The acid group in the acrylic copolymer is neutralized by the neutralizing agent to obtain the water-soluble acrylic resin in the first aspect of the present invention.

In a second aspect of the present invention, the present invention provides a resin composition used for a water-based coating composition and containing the above water-soluble acrylic resin as a vehicle component.

The resin composition contains the water-soluble acrylic resin as the vehicle component, but optionally and additionally may include other water-soluble and/or water-dispersible resins used as film-forming components for the known water-based coating composition. Examples of the other water-soluble and/or water-dispersible resin may include ones prepared by making water-soluble or water-dispersible, for example, acrylic resin, polyurethane resin, alkyd resin, polyester resin, cellulose resin and the like. Of these, a combined use of an urethane resin emulsion and/or acrylic resin emulsion with the water-soluble acrylic resin is preferable from the standpoints of compatibility with the water-soluble acrylic resin and coating film properties.

The water-soluble acrylic resin is contained in an amount of 5 parts by weight or more, preferably 10 to 35 parts by weight per 100 parts by weight of a total resin solid content as the vehicle component. A content less than 5 parts by weight makes it impossible to sufficiently bridge gaps between particles of the resin emulsion used in combination, resulting in that the coating film shows unsatisfactory water resistance.

The resin composition may optionally contain a crosslinking agent. Examples of the crosslinking agent may include amino resin, (blocked) polyisocyanate, epoxy resin, etc., which are water-soluble or water-dispersible respectively.

The resin composition optionally may contain other components conventionally used for the preparation of the water-based coating composition, for example, thickening agent, surface controlling agent, anti-foaming agent, curing catalyst, water, organic solvent, color pigment, extender pigment, and the like to prepare a water-based coating composition.

In the third aspect of the present invention, the present invention provides a water-based coating composition containing, as major components, (A) at least one resin selected from the group consisting of a water-soluble resin and a water-dispersible resin and (B) a pigment, said pigment (B) being subjected to dispersion treatment with a water-soluble acrylic resin (C), which is prepared by neutralizing with a neutralizing agent an acrylic copolymer formed by copolymerizing (a) the alkylene oxide group-containing (meth) acrylate, (b) the cyclic saturated hydrocarbon group-containing (meth)acrylate, and (e) other unsaturated monomer, followed by being mixed with the resin (A) to form a water-based coating composition.

The at least one resin (A) selected from the group consisting of the water-soluble resin and water-dispersible resin may include the same ones as other water-soluble and/or water-dispersible resins used in the second aspect of the present invention. Of these, a combined use of an urethane resin emulsion and/or acrylic resin emulsion is preferable. In the case where the resin (A) contains a crosslinkable functional group such as hydroxyl group, a curing agent reactable with the crosslinkable functional group may be added. Examples of t;he curing agent may include respectively water-soluble or water-dispersible amino resin, (blocked) polyisocyanate, epoxy resin, and the like.

The pigment (B) may include metal pigments, color pigments, etc. The metal pigment may include, for example, metals such as aluminum, copper, zinc, iron, tin and the like; alloys of these metals and mica pigment, a shape thereof may not particularly be limited, but is suitably flaky. The metal pigment is preferably subjected to dispersion treatment and coated with a treating agent containing phosphate group or sulfonate group from the standpoint of controlling the generation of hydrogen gas. The treating agent containing phosphate group or sulfonate group may include known low molecular weight compounds and copolymers without particular limitations.

Examples of the color pigment may include inorganic color pigments such as titanium oxide, red oxide, yellow iron oxide, carbon black and the like; organic color pigment such as phthalocyanine blue, quinacridone red, perylene red and the like.

The water-soluble acrylic resin (C) may be prepared by neutralizing with a neutralizing agent an acrylic copolymer which is formed by copolymerizing (a) alkylene oxide group-containing (meth)acrylate identical to that in the water-soluble acrylic resin of the first aspect of the present invention, (b) cyclic saturated hydrocarbon group-containing (meth)acrylate identical to that in the water-soluble acrylic resin of the first aspect of the present invention, and (e) other unsaturated monomer including the monomer (c) and monomer (d) in the water-soluble acrylic resin of the first aspect of the present invention. In the case of the water-soluble acrylic resin (C), provided that when $R_1$ in the general formula (I) is alkyl group or acyl group, the alkyl group or acyl group preferably has 1 to 3 carbon atoms, and that m in the general formula (I) desirably is 1 to 100, preferably 5 to 50. When m is more than 100, too strong hydrophilic properties may reduce water resistance of the coating film.

Mixed amounts of the above monomers are such that the monomer (a) is in the range of 3 to 30% by weight, preferably 5 to 25% by weight, monomer (b) is in the range of 10 to 50% by weight, preferably 20 to 40% by weight, and monomer (e) is in the range of 20 to 87% by weight, preferably 35 to 75% by weight. When the amount of the monomer (a) is less than 3% by weight, pigment dispersibility is reduced and the coating composition shows poor storage stability. On the other hand, more than 30% by weight, too strong hydrophilic properties as the coating composition may reduce water resistance of the coating film. When the amount of the monomer (b) is less than 10% by weight, loss of a hydrophilic-hydrophobic balance of the water-soluble acrylic resin (C) may make it impossible for the water-soluble acrylic resin (C) to effectively adsorb onto the pigment, resulting in reducing pigment dispersibility. On the other hand, more than 50% by weight, too strong hydrophobic properties may cause separation of the resin (C) from the resin (A) during storage.

The water-based coating composition in the third aspect of the present invention is such that the pigment (B) is subjected to dispersion treatment with the water-soluble acrylic resin (C), followed by being mixed with the water-soluble and/or water-dispersible resin (A) to prepare a water-based coating composition. The dispersion treatment may be carried out by mixing with agitation the pigment (B) and the water-soluble acrylic resin (C) in a suitable dispersion apparatus.

A mixing ratio of the pigment (B) and the water-soluble acrylic resin (C) is such that the pigment (B) is in the range of 50 to 150 parts by weight per 100 parts by weight of the resin solid content of the resin (C). In the case where the pigment (B) is a metal pigment having a particle size of 10 μm or less, the pigment (B) is preferably in the range of 60 to 100 parts by weight per 100 parts by weight of the resin solid content of the resin (C).

An amount of the water-soluble acrylic resin (C) is preferably in the range of 5 parts by weight or more, preferably 10 to 35 parts by weight per 100 parts by weight of a total resin solid content of the components (A) and (C).

The water-based coating composition in the third aspect of the present invention may optionally contain other components conventionally used in the preparation of the water-based coating composition, for example, a thickening agent, surface controlling agent, pigment dispersing agent, protective colloid, anti-foaming agent, curing catalyst, water, organic solvent, extender pigment and the like.

In the fourth aspect of the present invention, the present invention provides a coating method which comprises coating the above water-based coating composition as a base coat coating composition onto a substrate, followed by coating a top clear coating composition thereonto.

The above substrate may include ones provided by applying the known primer coating onto a metal or plastic material, for example, an automobile body onto which an electrodeposition coating or intercoat has been applied, or a repair coating on the automobile body.

The above water-based coating composition is coated onto the substrate to be a dry film thickness of 10 to 30 μm to obtain a base coat coating film. The base coat coating film may be cured prior to coating a top clear coating composition, or the top clear coating composition may be coated onto the base coat coating film by wet-on-wet coating.

The top clear coating composition used in the fourth aspect of the present invention may include any known ones without particular limitations, mainly the organic solvent based coating composition including non-aqueous dispersion type coating composition and powder coating composition, for example, a curable coating composition containing, as major components, acrylic resin or fluorocarbon resin respectively containing a crosslinkable functional group such as hydroxyl group and a crosslinking agent such as (blocked) polyisocyanate, melamine resin or the like; a lacquer coating composition containing, as a major component, a cellulose acetate butylate-modified acrylic resin, and the like. Particularly, in the case where an urethane-curable coating composition is used as the top clear coating composition, an isocyanate component may partly migrate from the top clear coating film to the base coat coating film, resulting in that even if the water-soluble and/or water-dispersible resin (A) used in the base coat coating composition contains hydroxyl group, use of a crosslinking agent in the base coat coating composition may be unnecessary, or may be reduced.

The top clear coating composition may optionally contain additives for use in, the coating composition, for example, polymer fine particles, curing catalyst, ultraviolet light absorbing agent, antioxidant, surface controlling agent, anti-foaming agent and the like. A coating film formed from the top clear coating composition suitably has a dry film thickness in the range of 20 to 100 μm.

A coating method of the base coat coating composition and the top clear coating composition may include any known coating methods without particular limitations, for example, spray coating, electrostatic coating, and the like.

According to the first aspect of the present invention, a water-soluble acrylic resin made hydrophobic to a suitable extent without impairing water solubility is provided by use of an acrylic copolymer formed by copolymerizing a specified monomer mixture.

According to the second aspect of the present invention, a resin composition containing the above water-soluble acrylic resin, used for a water-based coating composition and capable of forming a coating film showing good water resistance without developing whitening is provided.

According to the third aspect of the present invention, a water-based coating composition containing a metal pigment, capable of controlling generation of hydrogen gas particularly when the metal pigment has a small particle size, and capable of forming a coating film showing good water resistance and adhesion properties is provided by use of a water-soluble acrylic resin well balanced between hydrophobic properties and hydrophilic properties.

On the other hand, according to the third aspect of the present invention, a water-based coating composition containing a color pigment, capable of improving dispersibility and storage stability and capable of forming a coating film showing good water resistance and adhesion properties is provided by use of the water-soluble acrylic resin well balanced between hydrophobic properties and hydrophilic properties.

According to the fourth aspect of the present invention, a coating method using the above water-based coating composition as a base coat coating composition and suitable for a finish coating of an automobile body etc. is provided.

The present invention will be explained more in detail by the following Examples, in which "part" and "%" represent "part by weight" and "% by weight" respectively.

Preparation of Water-Soluble Acrylic Resin Solution

Example 1

A four-necked flask equipped with a stirrer, thermometer and a nitrogen gas inlet was charged with 58 parts of butyl cellosolve and was heated up to 117° C. under a nitrogen atmosphere, followed by dropping over 3 hours a mixture of 19 parts of methyl methacrylate, 22 parts of n-butyl methacrylate, 40 parts of isobornyl acrylate, 5 parts of hydroxyethyl acrylate, 4 parts of acrylic acid, 10 parts of RMA-450M (Note 1) and 0.3 part of azobisisobutyronitrile in a monomer vessel, washing the monomer vessel with 11.5 parts of butyl cellosolve, adding the resulting washing solution into the flask, reacting for 30 minutes after the completion of the dropping procedure, dropping over one hour a solution consisting of 0.5 part of 2,2'-azobis (2,4-dimethylvaleronitrile) and 11.5 parts of butyl cellusolve, stirring for 30 minutes, cooling down to 70° C., adding a solution consisting of 5.6 parts of triethylamine and 7.7 parts of butyl cellosolve, and adding 5.7 parts of deionized water to obtain a water-soluble acrylic resin solution (C-1) having a non-volatile matter content of 50.2%, viscosity of YZ (measured by Gardner-Holdt bubble viscometer, at 25° C.) and an acid value of 31.

(Note 1) RMA-450M: Trade name, marketed by Nippon Nyukazai Co., Ltd., polyoxyethylene (45 units)-containing methacrylate.

Examples 2–6 and Comparative Examples 1–5

The same procedures of Example 1 were duplicated except that compositions of monomers and catalysts were as shown in Table 1 to obtain water-soluble acrylic resin solutions (C-2) to (C-11). Property values of respective resins are shown in Table 1.

The water-soluble acrylic resin solutions (C-1) to (C-11) were diluted with deionized water so as to have a non-volatile matter content of 30%, followed by being coated onto a glass plate by a 250 μm applicator, drying at 60° C. for one hour to obtain a coating plate, dipping the coating plate into a tap water for 24 hours to examine water resistance i.e. resistance to whitening and blistering of a clear coating film. The results were visually evaluated as follows. 3: Nothing abnormal; 2: Little blisters developed; 1: Whitening and blistering of the coating film developed. The results are shown in Table 1.

(Note 2) RMA-150M: Trade name, marketed by Nippon Nyukazai Co., Ltd., polyoxyethylene (15 units)-containing methacrylate (Note 3) RMH-4000: Trade name, marketed by Nippon Nyukazai Co., Ltd., polyoxyet;hylene (100 units)-containing methacrylate.

TABLE 1

| | | Examples | | | | | | | Comparative Examples | | | | |
|---|---|---|---|---|---|---|---|---|---|---|---|---|---|
| | | 1 | 2 | 3 | 4 | 5 | 6 | | 1 | 2 | 3 | 4 | 5 |
| Water-soluble acrylic resin solution | | C-1 | C-2 | C-3 | C-4 | C-5 | C-6 | | C-7 | C-8 | C-9 | C-10 | C-11 |
| Composition | RMA-450M (Note 1) | 10 | 20 | 10 | | | 10 | | | | | 10 | 10 |
| | RMA-150M (Note 2) | | | | 10 | | | | | | | | |
| | RMH-4000 (Note 3) | | | | | 10 | | | | | | | |
| | isobornyl acrylate | 40 | 40 | 35 | 40 | 40 | | | | | | | |
| | adamantyl methacrylate | | | | | | 40 | | | | 40 | | |
| | methyl methacrylate | 19 | 14 | 19 | 19 | 19 | 19 | | 49 | 19 | 19 | 49 | 19 |
| | n-butyl methacrylate | 22 | 17 | 22 | 22 | 22 | 22 | | 32 | 23 | 22 | | 22 |
| | n-butyl acrylate | | | | | | | | | 9 | | 20 | |
| | stearyl methacrylate | | | | | | | | | 30 | | | 40 |
| | styrene | 5 | 5 | | 5 | 5 | 5 | | 15 | 15 | 15 | | 5 |
| | hydroxyethyl acrylate | | | 10 | | | | | | | | 17 | |
| | hydroxyethyl methacrylate | | | | | | | | | | | | |
| | acrylic acid | 4 | 4 | 4 | 4 | 4 | 4 | | 4 | 4 | 4 | 4 | 4 |
| | azoisobutyronitrile | 0.3 | 0.3 | 0.3 | 0.3 | 0.3 | 0.3 | | 0.3 | 0.3 | 0.3 | 0.3 | 0.3 |
| | additional catalyst, 2,2'-azobis(2,4-dimethylvaleronitrile) | 0.5 | 0.5 | 0.5 | 0.5 | 0.5 | 0.5 | | 0.5 | 0.5 | 0.5 | 0.5 | 0.5 |
| solid content (%) | | 50 | 50 | 50 | 50 | 50 | 50 | | 50 | 50 | 50 | 51 | 50 |
| viscosity | | YZ | XY | Z | X | Y | Z | | Z1Z2 | Z6 | Z1 | Z4Z5 | X- |
| acid value | | 31 | 31 | 31 | 31 | 31 | 31 | | 31 | 31 | 31 | 31 | 31 |
| weight average molecular weight | | 51800 | 42300 | 49200 | 39000 | 40300 | 50000 | | 56100 | 93300 | 44200 | 78000 | 41000 |
| glass transition temperature | | 38 | 23 | 46 | 28 | 42 | 42 | | 27 | 29 | 44 | 44 | −13 |
| solubility parameter | | 8.99 | 9.39 | 9.31 | 8.90 | 9.02 | 8.95 | | 10.3 | 9.34 | 8.65 | 10.3 | 8.59 |
| water resistance of clear coating film | | 3 | 3 | 3 | 3 | 3 | 3 | | 1 | 1 | 2 | 2 | 2 |

Preparation of Resin Composition for Water-Based Coating Composition

Examples 7–13 and Comparative Examples 6–11

To the above water-soluble acrylic resin solutions (C-1) to (C-11) were added clear components, i.e. urethane resin emulsion, acrylic resin emulsion and surface controlling agent as shown in Table 2 in an amount shown in Table 2 respectively, followed by mixing with agitation, adjusting a pH to 8.0 with triethylamine, and adding deionized water to obtain respective resin compositions (D-1) to (D-13) having a solid content of 40%. In Table 2, formulations are represented by solid content.

Respective resin compositions were coated onto a glass plate by use of a 100 μm applicator, followed by drying at 60° C. for one hour to obtain a coating plate. Respective coating plates were subjected to tests for degree of water absorption, degree of eluation and water resistance. Results are shown in table 2, in which (Note 4) to (Note 6) and test methods are shown as follows.

(Note 4) urethane resin emulsion: prepared as follows.

A polymerization reactor was charged with a mixture of 115.5 parts of polybutylene adipate having a number average molecular weight of 2000, 115.5 parts of polycaprolactonediol having a number average molecular weight of 2000, 23.2 parts of dimethylolpropionic acid, 6.5 parts of 1,4-butanediol and 120.1 parts of 1-isocyanato-3-isocyanatomethyl-3, 5,5-trimethylcyclohexane, followed by reacting at 85° C. for 7 hours with agitation under nitrogen atmosphere to obtain a NCO group-terminated prepolymer having a NCO group content of 4.0%, cooling down the prepolymer to 50° C., adding 165 parts of acetone to uniformly dissolve the prepolymer therein, adding 15.7 parts of triethylamine with agitation, adding 600 parts of deionized water at 50° C. or lower to obtain a water dispersion, keeping the water dispersion at 50° C. for 2 hours to complete a water-extending reaction between water and both NCO groups in respective prepolymers, and distilling off acetone at 70° C. or lower under vacuum to obtain an urethane resin emulsion having a solid content of 39%.

(Note 5) acrylic resin emulsion: prepared as follows.

A reactor was charged with 140 parts of deionized water, 2.5 parts of Newcol-707SF (Trade name, marketed by Nippon Nyukazai Co., Ltd., surface active agent, solid content 30%) and one part of a monomer mixture containing 55 parts of methyl methacrylate, 8 parts of styrene, 9 parts of n-butyl acrylate, 5 parts of 2-hydroxyethyl acrylate, 2 parts of 1, 6-hexanediol diacrylate and one part of methacrylic acid, followed by mixing with agitation under nitrogen atmosphere, adding 3 parts of 3% ammonium persulfate at 60° C., heating at 80° C., adding a preemulsion containing 79 parts of the remaining monomer mixture, 2.5 parts of Newcol-707SF (the above trade name), 4 parts of 3% ammonium persulfate and 42 parts of deionized water to the reactor over 4 hours by use of a metering pump, aging for one hour, simultaneously and in parallel dropping 20.5 parts of a monomer mixture containing 5 parts of methyl methacrylate, 7 parts of n-butyl acrylate, 5 parts of 2-ethylhexyl acrylate, 3 parts of methacrylic acid and 0.5 part of Newcol-707SF (the above trade name), and 4 parts of 3% ammonium persulfate at 80° C. over 1.5 hours, aging for one hour, diluting with 30 parts of deionized water, filtering with a 200 mesh nylon cloth at 30° C., adding deionized water to a filtrate, adjusting a pH at 7.5 with triethylamine to obtain an acrylic resin emulsion having a mean particle size of 0.1 μm and a solid content of 20%.

(Note 6) Surface controlling agent: Trade name, BYK-034, marketed by BYK CHEMIE CO.

Test Method

Degree of Water Absortion:

Respectively, a clear coating film was separated from the coating plate, followed by dipping the clear coating film into a tap water at 20° C. for 6 days, taking up the clear coating film to measure its weight ($W_1$), and drying the clear coating film at 105° C. for one hour to measure its weight ($W_2$)

A degree of water absorption(%) of the clear coating film was respectively determined from a weight difference between $W_1$ and $W_2$ according to the following equation:

$$\text{Degree of water absorption}(\%) = (W_1 - W_2)/W_2 \times 100(\%)$$

Degree of Elution:

Respectively, a clear coating film was separated from the coating plate to measure a weight ($W_0$) of the clear coating film, followed by dipping the clear coating film into a tap water at 20° C. for 6 days, and taking up and drying the clear coating film at 105° C. for one hour to measure a weight ($W_2$) of the clear coating Film. A degree of elution (%) of the clear coating film was respectively determined according to the following equation:

$$\text{Degree of Elution }(\%) = \{1 - (W_2/W_0)\} \times 100 \ (\%)$$

Water Resistance:

Respectively, a coating plate was dipped into a tap water at 30° C. for 6 hours, followed by visually evaluating the water resistance, i.e., resistance to whitening and blistering, as follows.

3: Nothing abnormal; 2: Little blisters developed; 1: Whitening or blistering of the coating film developed.

TABLE 2

| | | | Examples | | | | | | | Comparative Examples | | | | | |
|---|---|---|---|---|---|---|---|---|---|---|---|---|---|---|---|
| | | | 7 | 8 | 9 | 10 | 11 | 12 | 13 | 6 | 7 | 8 | 9 | 10 | 11 |
| Resin compositions | | | D-1 | D-2 | D-3 | D-4 | D-5 | D-6 | D-7 | D-8 | D-9 | D-10 | D-11 | D-12 | D-13 |
| Formulations | Water-soluble | C-1 | 25 | | | | | | | | | | | | |
| of resin | acrylic resin | C-2 | | 25 | | | | | | | | | | | |
| Compositions | solutions | C-3 | | | 25 | | | | | | | | | | |
| | | C-4 | | | | 25 | | | | | | | | | |
| | | C-5 | | | | | 25 | | | | | | | | |
| | | C-6 | | | | | | 25 | 25 | | | | | | |
| | | C-7 | | | | | | | | 25 | | | | | 25 |
| | | C-8 | | | | | | | | | 25 | | | | |
| | | C-9 | | | | | | | | | | 25 | | | |
| | | C-10 | | | | | | | | | | | 25 | | |
| | | C-11 | | | | | | | | | | | | 25 | |

TABLE 2-continued

|  |  | Examples |  |  |  |  |  |  | Comparative Examples |  |  |  |  |  |
|---|---|---|---|---|---|---|---|---|---|---|---|---|---|---|
|  |  | 7 | 8 | 9 | 10 | 11 | 12 | 13 | 6 | 7 | 8 | 9 | 10 | 11 |
|  | Urethane resin emulsion (Note 4) | 75 | 75 | 75 | 75 | 75 | 75 |  | 75 | 75 | 75 | 75 | 75 |  |
|  | Acrylic resin emulsion (Note 5) |  |  |  |  |  |  | 75 |  |  |  |  |  | 75 |
|  | Surface controlling agent (Note 6) | 0.1 | 0.1 | 0.1 | 0.1 | 0.1 | 0.1 | 0.1 | 0.1 | 0.1 | 0.1 | 0.1 | 0.1 | 0.1 |
| Clear coating film performances | Degree of water absorption (%) | 15 | 16.2 | 15.5 | 18 | 17.3 | 16 | 8.6 | 78.1 | 22 | 24.5 | 65 | 22 | 25 |
|  | Degree of eluation (%) | 3.2 | 4.3 | 2.8 | 3.6 | 3.8 | 2.9 | 2.8 | 3.0 | 3.7 | 3.3 | 5.7 | 2.5 | 3.5 |
|  | Water resistance | 3 | 3 | 3 | 3 | 3 | 3 | 3 | 1 | 1 | 2 | 2 | 1 | 1 |

Preparation of Water-Soluble Acrylic Resin
Example 14

A reactor was charged with 75 parts of butyl cellosolve, followed by heating up to 115° C. under nitrogen atmosphere, adding a mixture containing 20 parts of methyl methacrylate, 20 parts of n-butyl methacrylate, 30 parts of isobornyl acrylate, 11 parts of styrene, 5 parts of hydroxyethyl acrylate, 4 parts of acrylic acid, 10 parts of RMA-450M (Note 1) and one part of azobisbutyronitrile over 3 hours, and aging for 2 hours, neutralizing at equivalence point with dimethyl ethanolamine after the completion of reaction, and adding 25 parts of butyl cellosolve to obtain a water-soluble acrylic resin solution (C-21 having an acid value of 31 and a viscosity of Z4 (measured by Gardner-Holdt bubble viscometer).

Examples 15–17 and Comparative Examples 12–13

The procedures of Example 14 were duplicated except that respective formulations of monomers and catalysts were as shown in Table 3 to obtain water-soluble acrylic resin solutions (C-13) to (C-17). (Note 7) RMH-1053: Trade name, marketed by Nippon Nyukazai Co., Ltd., polyethylene glycol monomethacrylate (15 units).

(Trade name, marketed by Asahi Chemical Industry Co., Ltd., metal content 60.9%) and 20 parts of butyl cellosolve, followed by adding one part of a phosphate group-containing treating agent (Note 4) while mixing with agitation, and stirring for one hour to obtain an aluminum pigment paste concentrated solution (B-1).

On the other hand, for comparison, the mixer was charged with 17 parts of the above aluminum pigment paste MR-9800 (the above trade name) and 20 parts of butyl cellosolve, followed by stirring for one hour to obtain an aluminum pigment paste concentrated solution (B-2).

(Note 8) Phosphate group-containing treating agent: amine-neutralized product of phosphate of alkylphenol Preparation of Metallic Base Coat Coating Composition
Example 18

A mixer equipped with a stirrer was charged with 110.1 parts of the above aluminum pigment paste concentrated solution (B-1) and 60 parts of the water-soluble acrylic resin solution (C-12), followed by stirring for one hour, adding 350 parts of the acrylic resin emulsion (Note 5) and 17.9 parts of Primal ASE-60 (Trade name, marketed by Rohm & Haas Co., Thickening agent), stirring for one hour, adjusting

TABLE 3

|  |  | Examples |  |  |  | Comparative Examples |  |
|---|---|---|---|---|---|---|---|
|  |  | 14 | 15 | 16 | 17 | 12 | 13 |
| Water-soluble Formulations | acrylic resin solution | C-12 | C-13 | C-14 | C-15 | C-16 | C-17 |
|  | RMA-450M (Note 1) | 10 | 20 |  |  |  | 20 |
|  | RMA-150M (Note 2) |  |  | 20 |  |  |  |
|  | RMH-1053 (Note 7) |  |  |  | 20 |  |  |
|  | isobornyl acrylate | 30 | 40 |  | 30 | 30 |  |
|  | adamantyl methacrylate |  |  | 25 |  |  |  |
|  | methyl methacrylate | 20 | 10 |  | 10 | 35 | 35 |
|  | n-butyl methacrylate | 20 |  | 20 | 5 |  | 16 |
|  | n-butyl acrylate |  | 10 |  |  |  |  |
|  | styrene | 11 | 11 | 21 | 21 | 16 | 15 |
|  | hydroxyethyl acrylate | 5 |  | 10 | 10 | 5 |  |
|  | hydroxyethyl methacrylate |  | 5 |  |  | 10 | 10 |
|  | acrylic acid | 4 | 4 | 4 | 4 | 4 | 4 |
|  | azobisbutyronitrile | 1 | 1 | 1 | 2 | 1 | 1 |
| acid value |  | 31 | 31 | 31 | 31 | 31 | 31 |
| viscosity |  | Z4 | Z2 | Z3 | Z | Z2 | Y |
| solid content (%) |  | 50 | 50 | 50 | 50 | 50 | 50 |

Preparation of Aluminum Pigment Paste Concentrated Solution

A mixer equipped with a stirrer was charged with 17 parts of an aluminum pigment paste having a particle size of 7 μm and a water surface covering area of ≧5m²/g, i.e. MR-9800 a pH at 8.0 with triebthylamine, and adding deionized water to obtain a metallic base coat coating composition having a solid content of 15%.

Examples 19–22 and Comparative Examples 14–19

Respective metallic base coat coating compositions were obtained in the same manner as in Example 18 except for components and formulations as shown in Table 4, which is represented as solid content.

(Note 9) Amount of generated hydrogen gas: Respective coating compositions were stored at 50° C. for 30 days in a closed system, followed by measuring an amount of hydrogen gas generated during storage per 100 g of the coating composition, and evaluating as follows.

4: Less than 1 cc; 3:1 cc or more but less than 2 cc; 2:2 cc or more but less than 5 cc; 1:5 cc or more.

TABLE 4

|  |  |  | Examples |  |  |  |  | Comparative Examples |  |  |  |  |  |
|---|---|---|---|---|---|---|---|---|---|---|---|---|---|
|  |  |  | 18 | 19 | 20 | 21 | 22 | 14 | 15 | 16 | 17 | 18 | 19 |
| Formulations of coating compositions | Aluminum pigment paste concentrated solution | B-1 | 30 |  | 30 | 30 | 30 | 30 | 30 | 30 |  |  | 30 |
|  |  | B-2 |  | 30 |  |  |  |  |  |  | 30 | 30 |  |
|  |  | C-12 | 30 | 30 |  |  |  |  |  |  |  |  |  |
|  | Water-soluble acrylic resin solutions | C-13 |  |  | 30 |  |  |  |  |  |  |  |  |
|  |  | C-14 |  |  |  | 30 |  |  |  |  |  |  |  |
|  |  | C-15 |  |  |  |  | 30 |  |  |  |  |  |  |
|  |  | C-16 |  |  |  |  |  | 30 | 50 |  | 30 | 50 |  |
|  |  | C-17 |  |  |  |  |  |  |  | 30 |  |  |  |
|  | Acrylic resin emulsion (Note 5) |  | 70 |  |  |  |  | 70 |  |  |  | 50 | 100 |
|  | Urethane resin emulsion (Note 4) |  |  | 70 | 70 | 70 | 70 |  | 50 | 70 | 70 |  |  |
|  | Primal ASE-60 |  | 5 | 5 | 5 | 5 | 5 | 5 | 5 | 5 | 5 | 5 | 5 |
| Amount of generated hydrogen gas (Note 9) |  |  | 4 | 3 | 4 | 4 | 4 | 1 | 2 | 1 | 1 | 1 | 1 |

Preparation of Color Pigment Paste

A mixer equipped with a stirrer was charged with 20 parts of the water-soluble acrylic resin solution (C-12), 100 parts of titanium oxide, 40 parts of deionized water and 0.16 part of an anti-foaming agent BYK-024 (Trade name, marketed by BYK CHEMIE CO.), followed by subjecting to dispersion treatment for one hour by use of a dispersion mixer to obtain a color pigment paste (P-1) having a solid content of 70%. Similarly, respective color pigment pastes (P-2) to (P-16) were prepared according to the formulations shown in Table 5.

The above color pigment pastes were coated onto a tinplate by use of a doctor blade of 150 $\mu$m film thickness, followed by subjecting to force-drying at 60° C. for 20 minutes to examine gloss i.e. 60° gloss. On the other hand, viscosity and storage stability of the dispersion were evaluated as follows. Results are shown in Table 5. Viscosity of Dispersion: An yield value (dyne/cm$^2$) of respective dispersions was measured by use of an elastoviscosimeter, MR-300 (Trade name, marketed by Rheology Co., Ltd.) to evaluate as follows. 3: less than 10 dyen/cm$^2$; 2:10 dyne/cm$^2$ or more but less than 20 dyen/cm$^2$; 1:20 dyne/cm$^2$ or more. Storage Stability:

Respective dispersions were stored at 40° C. for one month in a closed system, followed by examining changes in viscosity of the dispersions to evaluate as follows.

3: Unchanged; 2: thickened slightly; 1: thickened remarkably.

TABLE 5

| Formulations of color pigment pastes | | P-1 | P-2 | P-3 | P-4 | P-5 | P-6 | P-7 | P-8 | P-9 | P-10 | P-11 | P-12 | P-13 | P-14 | P-15 | P-16 |
|---|---|---|---|---|---|---|---|---|---|---|---|---|---|---|---|---|---|
| Water-soluble acrylic resin solutions | C-12 | 20 | | | | | | | | | | | | | | | |
| | C-13 | | 20 | | | | | | | | | | | | | | |
| | C-14 | | | 20 | | | | | | | | | | | | | |
| | C-15 | | | | 20 | | | | | | | | | | | | |
| | C-16 | | | | | 20 | 20 | 20 | 20 | 20 | | | | | | | |
| | C-17 | | | | | | | | | | 20 | 20 | 20 | 20 | 20 | 20 | 20 |
| titanium oxide | | 100 | 100 | 100 | 100 | | | | | | 100 | 100 | | | | | |
| cyanine blue | | | | | | 15 | | | | | | | 15 | | | | |
| quinacridone | | | | | | | 10 | | | | | | | 10 | | | |
| perylene | | | | | | | | 20 | | | | | | | 20 | | |
| iron oxide yellow | | | | | | | | | 30 | | | | | | | 30 | |
| carbon black | | | | | | | | | | 5 | | | | | | | 5 |
| anti-foaming agent dispersant (Note) | | 0.16 | 0.16 | 0.16 | 0.16 | 0.08 | 0.12 | 0.10 | 0.08 | 0.10 | 0.16 | 0.16 | 0.08 | 0.12 | 0.10 | 0.08 | 0.10 |
| solid content (%) | | 70 | 70 | 70 | 70 | 5 | 2 | 4 | 5 | 25 | 70 | 70 | 5 | 2 | 4 | 5 | 25 |
| Gloss (60° Gloss) | | 90 | 90 | 90 | 90 | 35 | 25 | 30 | 40 | 98 | 80 | 70 | 35 | 25 | 30 | 40 | 90 |
| Viscosity | | 3 | 3 | 3 | 3 | 95 | 100 | 98 | 100 | 3 | 2 | 2 | 80 | 88 | 88 | 60 | 2 |
| Storage stability | | 3 | 3 | 3 | 3 | 3 | 3 | 3 | 3 | 3 | 2 | 2 | 1 | 1 | 2 | 2 | 2 |
| | | | | | | 3 | 3 | 3 | 3 | 3 | 2 | 2 | 1 | 1 | 1 | 2 | 2 |

(Note): SOLSPERSE (Trade name, marketed by Imperial Chemical Industries Ltd.)

Preparation of Color Base Coat Coating Composition:
Example 23

A mixer equipped with a stirrer was charged with 160 parts of the above color pigment paste (P-1), 100 parts of acrylic resin emulsion (Note 5), 20 parts of urethane resin emulsion (Note 4) and 17.9 parts of Primal ASE-60 (the above trade name), followed by stirring for one hour, adjusting a pH at 8.0 with dimethylethanolamine, and adding deionized water to obtain a color base coat coating composition having a solid content of 35%.
Examples 24–26 and Comparative Examples 20–21

Respective color base coat coating compositions were prepared in the same manner as in Example 23 except for components and formulations shown in Table 6, which is represented by solid content.
Coating Examples
Examples 27–31 and Comparative Examples 22–27

Respectively, a commercially available lacquer primer surfacer was coated to be a dry film thickness of 40 μm onto a 300×100×0.8 mm mild steel sheet, followed by drying at room temperature for 30 minutes, abrading with a #400 water-resistant abrasive paper to prepare a coating panel, forming a coating film formed from TC-71 Clear (Trade name, amino-acrylic resin based clear coating composition, marketed by Kansai Paint Co., Ltd.) and corresponding to a coating film for new car grade on an automobile body onto the coating panel, coating thereonto the above metallic base coat coating composition to be a dry film thickness of 15 μm by use of a spray gun, setting for 10 minutes, subjecting to force-drying at 60° C. for 10 minutes, coating RETAN PG2KM Clear (Trade name, marketed by Kansai Paint Co., Ltd., urethane curable clear coating composition) to be a dry film thickness of 40 to 50 μm by use of a spray gun, and subjecting to force-drying at 60° C. for 20 minutes to obtain respective coating test panels.
Examples 32–35 and Comparative Examples 28–29

Onto the same coating plate as above was coated TC-71 Clear (the above trade name) corresponding to a coating film for new car grade on an automobile body, followed by coating the above color base coat coating composition to be a dry film thickness of 25 to 30 μm by use of a spray gun, setting for 10 minutes, subjecting to force-drying at 60° C. for 10 minutes, coating RETAN PG2KM Clear (the above trade name) to be a dry film thickness of 40 to 50 μm by use of a spray gun, and subjecting to force-drying at 60° C. for 20 minutes to obtain respective coating test panels.

The above coating test panels were subjected to the following performance tests. Results are shown in Tables 7 and 8,.

(1) Adhesion Properties: Respective coating test panels were dipped into a tap water at 20° C. for 7 days, followed by taking out the panels, X-cutting the coating film so as to reach the substrate to form squares, adhering thereonto an adhesive cellophane tape, and strongly separating the tape to mine peeling off the squares. Evaluation was made as follows.
3: None of the squares were peeled off; 2: some squares were peeled off; 1: the squares were remarkably peeled off.
2: Water Resistance:

Respective coating test panels were dipped into a temperature controlled water bath at 40° C. for 10 days, followed by taking out the panels, leaving to stand for one hour to evaluate appearance of the coating film as follows. 3: Nothing abnormal; 2: flashing slightly developed; 1: flashing and blistering developed.

TABLE 6

|  |  |  | Examples | | | | Comparative Examples | |
|---|---|---|---|---|---|---|---|---|
|  |  |  | 23 | 24 | 25 | 26 | 20 | 21 |
| Formulations of coating compositions | Color pigment pastes | P-1 | 110 |  |  |  |  |  |
|  |  | P-2 |  | 110 |  |  |  |  |
|  |  | P-3 |  |  | 110 |  |  |  |
|  |  | P-4 |  |  |  | 110 |  |  |
|  |  | P-10 |  |  |  |  | 110 |  |
|  |  | P-11 |  |  |  |  |  | 110 |
|  | acrylic resin emulsion (Note 5) |  | 20 | 20 | 20 | 20 | 20 | 20 |
|  | urethane resin emulsion (Note 4) |  | 80 | 80 | 80 | 80 | 80 | 80 |
|  | Primal ASE-60 |  | 5 | 5 | 5 | 5 | 5 | 5 |

TABLE 7

| | | Example | | | | | Comparative Example | | | | | |
|---|---|---|---|---|---|---|---|---|---|---|---|---|
| | | 27 | 28 | 29 | 30 | 31 | 22 | 23 | 24 | 25 | 26 | 27 |
| Metallic base coat coating composition | | Example 18 | Example 19 | Example 20 | Example 21 | Example 22 | Comparative Ex. 14 | Comparative Ex. 15 | Comparative Ex. 16 | Comparative Ex. 17 | Comparative Ex. 18 | Comparative Ex. 19 |
| Coating film performances | Adhesion properties | 3 | 3 | 3 | 3 | 3 | 2 | 2 | 1 | 1 | 1 | 1 |
| | Water resistance | 3 | 3 | 3 | 3 | 3 | 1 | 1 | 1 | 1 | 1 | 1 |

TABLE 8

| | | Example | | | | Comparative Example | |
|---|---|---|---|---|---|---|---|
| | | 32 | 33 | 34 | 35 | 28 | 29 |
| Color base coat coating composition | | Example 23 | Example 24 | Example 25 | Example 26 | Comparative Ex. 20 | Comparative Ex. 21 |
| Coating film performances | Adhesion properties | 3 | 3 | 3 | 3 | 2 | 2 |
| | Water resistance | 3 | 3 | 3 | 3 | 2 | 2 |

What is claimed is:

1. A water-soluble acrylic resin which is prepared by neutralizing with a neutralizing agent which is an acrylic copolymer formed by copolymerizing 1 to 30 percent by weight of (a) an alkylene oxide group-containing (meth) acrylate represented by the following formula (1):

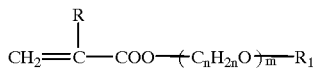
(I)

where R is hydrogen or methyl, $R_1$ is hydrogen, alkyl or acyl, m is an integer of 10 to 100, and n is an integer of 2 or 3, 0.5 to 80 percent by weight of (b) a cyclic saturated hydrocarbon group-containing (meth)acrylate selected from the group essentially consisting of isobornyl (meth)acrylate and adamantyl (meth)acrylate, 0 to 30 percent by weight of (c) a hydroxyl group-containing unsaturated monomer other than the monomer (a), and 0 to 98.5 percent by weight of (d) another unsaturated monomer.

2. A water-soluble acrylic resin as claimed in claim 1, wherein the acrylic copolymer has a weight average molecular weight of 10,000 to 200,000, and a glass transition temperature of −10° to 80° C.

3. A resin composition used for a water-based coating composition and containing, as a vehicle component, a water-soluble acrylic resin which is prepared by neutralizing with a neutralizing agent which is an acrylic copolymer formed by copolymerizing 1 to 30 percent by weight of (a) an alkylene oxide group-containing (meth)acrylate represented by the following formula (I):

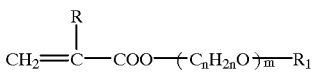
(I)

where R is a hydrogen or methyl, $R_1$ is hydrogen, alkyl or acyl, m is an integer of 10 to 100, and n is an integer of 2 or 3, 0.5 to 80 percent by weight of (b) a cyclic saturated hydrocarbon group-containing (meth)acrylate selected from the group essentially consisting of isobornyl (meth)acrylate and adamantyl (meth)acrylate, 0 to 30 percent by weight of (c) a hydroxyl group-containing unsaturated monomer other than the monomer (a), and 0 to 98.5 percent by weight of (d) another unsaturated monomer.

4. A resin composition as claimed in claim 3, wherein said resin composition contains at least one resin emulsion selected from the group consisting of an acrylic resin emulsion and urethane resin emulsion.

5. A resin composition as claimed in claim 3, wherein the water-soluble acrylic resin is contained in the range of 5 to 35 parts by weight; per 100 parts by weight of a total resin solid content as the vehicle component.

6. A water-based coating composition containing, as major components, (A) at least one resin selected from the group consisting of a water-soluble resin and a water-dispersible resin and (B) a pigment, said pigment (B) being subjected to dispersion treatment with a water-soluble acrylic resin (C), which is prepared by neutralizing with a neutralizing agent which is an acrylic copolymer formed by copolymerizing (a) an alkylene oxide group-containing (meth)acrylate represented by the following formula (I):

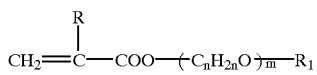

where R is a hydrogen or methyl, $R_1$ is hydrogen, alkyl or acyl, m is an integer of 5 to 50, and n is an integer of 2 or 3, (b) a cyclic saturated hydrocarbon group-containing (meth)acrylate selected from the group essentially consisting of isobornyl (meth)acrylate and adamantyl (meth)acrylate, and (e) another unsaturated monomer, followed by being mixed with the resin (A) to form a water-based coating composition.

7. A water-based coating composition as claimed in claim 6, wherein the acrylic copolymer is formed by copolymerizing 3 to 30% by weight of the monomer (a), 10 to 50% by weight of the monomer (b) and 20 to 87% by weight of the monomer (e).

8. A water-based coating composition as claimed in claim 6, wherein the resin (A) is at least one resin selected from the group consisting of an acrylic resin emulsion and an urethane resin emulsion.

9. A water-based coating composition as claimed in claim 6, wherein the pigment (B) is at least one pigment selected from the group consisting of a metal pigment and a color pigment.

10. A water-based coating composition as claimed in claim 6, wherein a mixing ratio between the pigment (B) and the water-soluble acrylic resin (C) is such that the pigment (B) is in the range of 50 to 150 parts by weight per 100 parts by weight of a resin solid content in the resin (C).

11. A water-based coating composition as claimed in claim 6, wherein the water-soluble acrylic resin (C) is contained in the range of 5 to 35 parts by weight per 100 parts by weight of a total resin solid content of the resin (A) and the resin (C).

12. A coating method comprising coating a base coat coating composition onto a substrate followed by coating a top clear coating composition, a water-based coating composition containing, as major components, (A) at least one resin selected from the group consisting of a water-soluble resin and a water-dispersible resin and (B) a pigment, said pigment (B) being subjected to dispersion treatment with a water-soluble acrylic resin (C), which is prepared by neutralizing with a neutralizing agent which is an acrylic copolymer formed by copolymerizing (a) an alkylene oxide group-containing (meth)acrylate represented by the following formula (I):

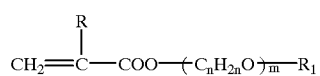

where R is hydrogen or methyl, $R_1$ is hydrogen, alkyl or acyl, m is an integer of 5 to 50, and n is an integer of 2 or 3, (b) a cyclic saturated hydrocarbon group-containing (meth)acrylate selected from the group essentially of isobornyl (meth)acrylate and adamantyl (meth)acrylate, and (c) another unsaturated monomer, followed by being mixed with the resin (A) to form a water-based coating composition, being used as the base coat coating composition.

* * * * *